United States Patent
Metzler

(10) Patent No.: US 7,885,197 B2
(45) Date of Patent: Feb. 8, 2011

(54) SYSTEM AND METHOD FOR MEASURING PER NODE PACKET LOSS IN A WIRELESS NETWORK

(75) Inventor: Benjamin T. Metzler, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2213 days.

(21) Appl. No.: 10/716,045

(22) Filed: Nov. 17, 2003

(65) Prior Publication Data

US 2005/0105474 A1    May 19, 2005

(51) Int. Cl.
*G01R 31/08* (2006.01)
(52) U.S. Cl. .................... 370/252; 370/232; 370/235; 370/238; 370/395.21
(58) Field of Classification Search .............. 370/252, 370/473, 235, 216, 254, 338
See application file for complete search history.

(56) References Cited

U.S. PATENT DOCUMENTS

| | | | |
|---|---|---|---|
| 2005/0041584 A1* | 2/2005 | Lau et al. ............... | 370/235 |
| 2005/0100049 A1* | 5/2005 | Siminoff ............... | 370/473 |
| 2005/0111422 A1* | 5/2005 | Nakanishi et al. ...... | 370/338 |
| 2005/0182850 A1* | 8/2005 | Kohno .................. | 709/236 |

\* cited by examiner

*Primary Examiner*—Dai A Phuong
(74) *Attorney, Agent, or Firm*—Blakely, Sokoloff, Taylor & Zafman LLP

(57) ABSTRACT

A method and system for configuring a wireless network, e.g., an ad hoc wireless network having a plurality of nodes and at least one server. In the wireless network, among other things, mesh network viability is maintained as packet loss information is recorded at a plurality of individual nodes in the wireless network during packet transmission from each of the plurality of nodes. The packet loss information may be stored at the at least one server for access at a period of time other than the moment when the packet is received at the at least one server from one of the plurality of nodes.

14 Claims, 2 Drawing Sheets

SYSTEM AND METHOD FOR MEASURING PER NODE PACKET LOSS IN A WIRELESS NETWORK

BACKGROUND

1. Technical Field

Specific matter disclosed herein relates to the field of wireless networks.

2. Background Information and Description of Related Art

Advancements in technology have enabled small, wireless devices to interact with one another to form wireless networks, e.g., mesh or managed networks and ad hoc wireless networks. An ad hoc wireless network, as compared to a managed network, is a wireless network in which wireless communications occur directly between wireless communication devices such as a peer to peer network without a managed node, e.g., between laptops or other wireless devices. A managed wireless network is the type of network that is found in a specific location such as a coffee shop or at a wireless access point of a home network, i.e., a "hotspot."

Wireless devices such as the wireless devices of an ad hoc network can be deployed in various environments where a wired network would not be feasible, such as an unwired industrial area. By establishing an ad hoc network in such an environment, the total cost of ownership associated with a network can be reduced by eliminating the need for wiring. Testing of wireless networks may be desired for, among other things, testing of packet loss when the packets are transmitted from node to node across a communication link. However, current test methodologies for networks, such as Ethernet (versions of IEEE Std. 802.3), are less useful in an ad hoc wireless network, where each node in the network may have different packet loss characteristics.

For example, current test methodologies incorporate endpoints in the network and assume a reliable medium for measuring test results across a network. Existing test systems ignore the fact that each node of a wireless ad hoc network may have different packet loss characteristics because the transmission medium is often inconsistent from point to point. Thus, it would be desirable to measure the per node packet loss at each node in a wireless network in order to determine the overall mesh network viability.

In some wireless networks, it is desirable to measure network viability. Mesh network viability is measured with endpoint nodes and per node packet loss. The term "per node packet loss" as referred to herein refers to the packet loss per node in a wireless network. The term "endpoint node" as referred to herein refers to a node of a wireless network that is used in the calculation of packet loss in a wireless network. The term "mesh network viability" as referred to herein represents the cumulative packet loss of the overall network, i.e., packet loss for all nodes of the wireless network, versus the single node packet loss generation of a wireless network endpoint node.

Because a number of the existing wireless technologies are battery powered, packet loss may be a drain on the batteries. One source of battery drain is the re-transmission of lost packets. In a wireless network, it is possible for network topology to create excessive packet loss between nodes in the wireless network because, for example, an obstruction is present or introduced between two nodes, or excessive network packet traffic is using a particular node to carry out network communications between a node and a server.

For example, if three nodes in a wireless network are routing packets through a single node, that node may be overloaded. Because the node is overloaded, a significant number of the packets from that portion of the network may be lost. Depending on where the test endpoint is placed in the network, the current methodologies for testing network packet loss may not see this issue. If the endpoint is placed in such a way that the overloaded node is not part of the test, the test may report that the link/node has a low packet loss and therefore the network has a low packet loss in general, and as such, erroneously so, may be assumed as not needing servicing. Examples of routing protocols that run on technologies that can be battery powered are DSDV (Destination-Sequenced distance Vectoring) and AODV (Ad Hoc On Demand Vectoring).

Many other problems and disadvantages of the prior art will become apparent to one skilled in the art after comparing such prior art with the present invention as described herein.

BRIEF DESCRIPTION OF DRAWINGS

The invention may best be understood by referring to the following description and accompanying drawings that are used to illustrate embodiments of the invention. In the drawings.

DETAILED DESCRIPTION

Figure 1:
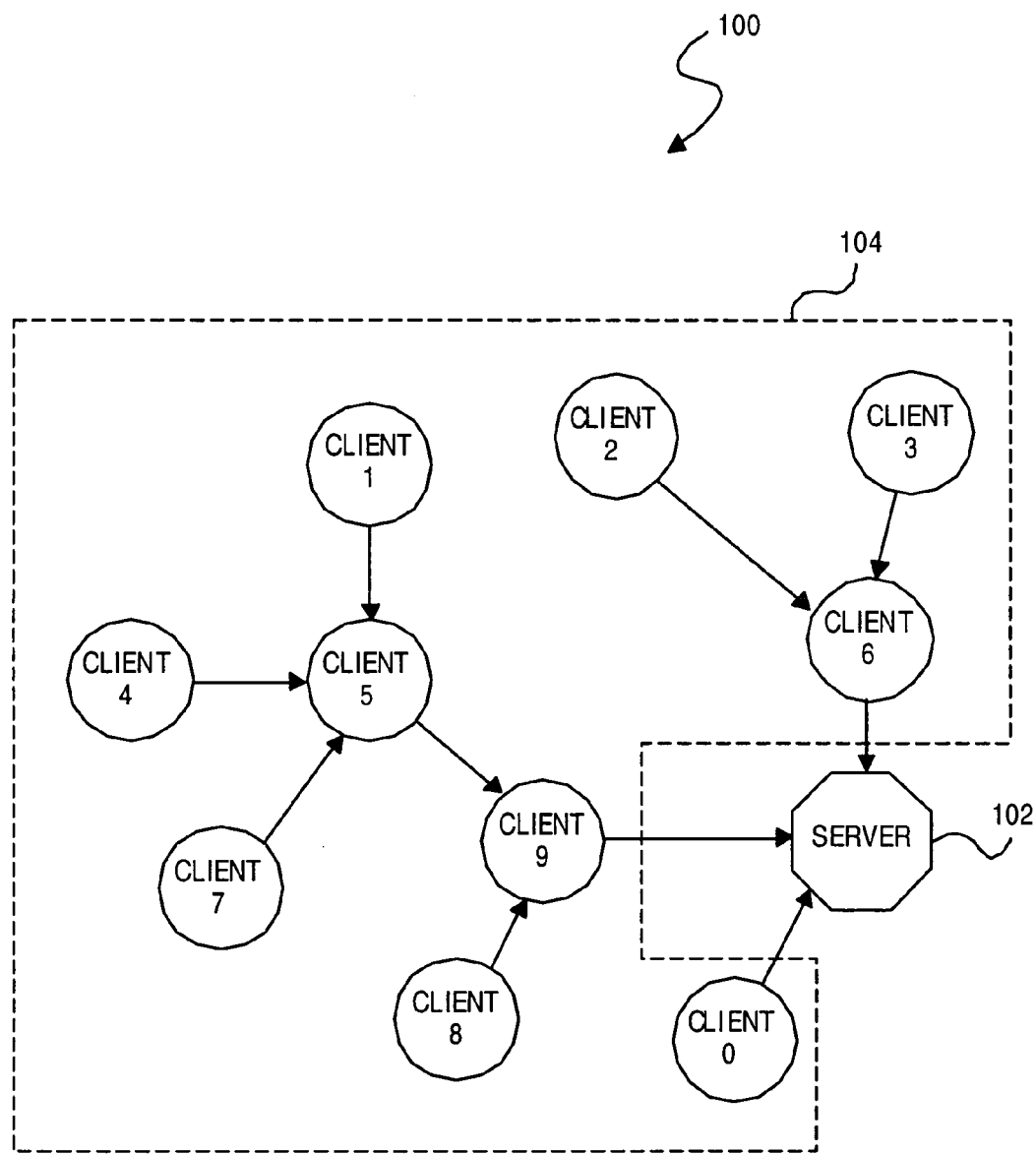
FIG. 1 illustrates a wireless network of nodes and a server operating according to an exemplary embodiment of the present invention.

In the following description, specific matter disclosed herein relates to the field of wireless networks for a system and method for measuring per-node packet loss in a wireless network. Specific details of exemplary embodiments of the present invention are set forth. However, it is understood that embodiments of the invention may be practiced without these specific details. In other instances, well-known circuits, structures and techniques have not been shown in detail in order not to obscure the understanding of this description.

The term "memory medium" is intended to include an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, flash, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. However, these are merely examples of a memory medium and embodiments of the present invention are not limited in these respects.

The term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDS) or one or more Complex PLDs (CPLDs), or other types of programmable hardware. A programmable hardware element may also be referred to as "reconfigurable logic". A programmable hardware element may be configured using a hardware configuration program. However, these are merely examples of a programmable hardware element and reconfigurable or programmable logic, and embodiments of the present invention are not limited in these respects.

The term "program" is intended to have the full breadth of its ordinary meaning. The term "program" includes 1) a software program which may be stored in a memory or memory medium and is executable by a processor or 2) a hardware configuration program useable for configuring a programmable hardware element. However, these are merely examples of a program and embodiments of the present invention are not limited in these respects.

The term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner. However, these are merely examples of a software program and embodiments of the present invention are not limited in these respects.

The term "hardware configuration program" is intended to include a netlist, bit file, or other type of program or data structure that can be used to program or configure a programmable hardware element. However, these are merely examples of a hardware configuration program and embodiments of the present invention are not limited in these respects.

The term "machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

The term "storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic or semiconductor storage media. However, these are merely examples of a storage medium and embodiments of the present invention are not limited in these respects.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or FPGA. Also, logic may comprise machine-readable instructions stored in a storage medium in combination with processing circuitry to execute such machine-readable instructions. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in these respects.

A "communication network" as referred to herein relates to a plurality of entities that may exchange data through a data transmission medium. In one example, each entity in the communication network may be associated with an "address" that is used for transporting data to the entity according to a data communication protocol. However, this is merely an example of a communication network and embodiments of the present invention are not limited in this respect.

An "Internet connection" as referred to herein relates a means for accessing any one of several entities coupled to a communication network known as the "Internet." The Internet comprises a networking infrastructure comprising a network of networks. An entity on the Internet may be associated with a "globally routable Internet Protocol (IP) address" which may be used for addressing data transmissions according to an Internet Protocol. An Internet connection may be provided by any one of several commercial Internet service providers (ISPs). An ISP may forward a message from a subscriber to any one of several entities on the Internet according to a globally routable IP address associated with the entity. However, these are merely examples of an Internet connection and embodiments of the present invention are not limited in these respects.

A "local network" as referred to herein relates to a communication network having entities that communicate according to a locally defined data communication protocol. For example, each entity in a local network may be associated with a "local address" which is unique among local addresses allocated to entities in the local network. This may enable entities in the local network to communicate with one another using the allocated local addresses and the locally defined communication protocol. Using only the allocated local addresses and locally defined communication protocol, however, each entity in the local network may be limited to communicating with entities in the local network and may not be capable of communicating with other entities in a larger communication network that includes the local network. However, these are merely examples of a local network and embodiments of the present invention are not limited in these respects.

A "gateway" as referred to herein relates to an entity in a local network that is capable of communicating with other entities within or outside of the local network. For example a gateway may be capable of communicating with entities in the local network using allocated local addresses according to a locally defined data communication protocol and also capable of communicating with entities outside of the local network using a different addressing scheme or data communication protocol. Such a gateway may also be capable of forwarding data communications between entities in the local network and entities outside of the local network. However, these are merely examples of a gateway and embodiments of the present invention are not limited in these respects.

The term "network element" as referred to herein represents a network device such as a router, switch, gateway, or NAT (defined later herein) that is used to transmit a packet to another entity on the local network or via an Internet connection. However, these are merely examples of a network element and embodiments of the present invention are not limited in these respects.

The term "network protocol processing" as used herein refers to network processing or processing in processing systems such as a communication network or local area network in which network processing is accomplished with protocol processing such as, for example, TCP/IP (Transmission Control Protocol/Internet Protocol) or other network protocol. However, these are merely examples of network protocol processing and embodiments of the present invention are not limited in these respects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention may best be understood by analyzing two elements of a wireless network, a node client element and a server element. When combined to form a whole, the node client element and the server element are capable of measuring the per node packet loss for an ad hoc network.

Node Client Element: The node client element may be considered to be a packet generation utility that exists on multiple ad hoc wireless connected nodes. At any point in time, the nodes may generate network packets that are encoded with a unique identification for the originating node and the number of packets generated up to that point in time. The unique identifier may be used as the packet source identifier received by a server, but may not reflect the true source of the packet (as in the case of a NAT device, i.e., a "Network Address Translation" device). The node client element (sometimes referred to herein as "packet generation" utility) can be adjusted using a local or remote user interface such as a command line where adjustment commands are typed by a user to, for example, increase or decrease the packet size and generation rate to better reflect network variations, network variations such as changes in network topology or packet transmission choices.

Server Element: In addition to the server element receiving the packets from one of the node client elements, the server element may parse the received packet data, calculate the per-node packet loss of each node client element by comparing the number of packets received and the number of packets sent, and may store that data in the server element for later use. The server element may also calculate and store additional data, such as last packet arrival time or duplicate packet count.

A transmission medium may be tested with the assumption that the transmission medium under test has uniform reliability from node to node, regardless of the node location in the transmission medium. A single node of the network may test a communication link by acting as a single node of the network, and assume that the measured packet loss will be consistent across all nodes of the transmission medium. However, depending on multiple factors, each node of the transmission medium may have different packet loss characteristics; in the present disclosure these loss characteristics are tracked by individual node testing of each link of the transmission medium on a per-node basis.

An improved network configuration may be identified by measuring the packet loss for any given or all nodes in the network. Further, by measuring the packet loss of a communication link at a given node, the node may be adjusted to enhance or influence battery lifetime.

FIG. 1 illustrates an exemplary wireless network 100 of nodes 104 and a server 102 operating according to an embodiment of the present invention. In other words, the wireless network 100 may form a communication network, e.g., an ad hoc network. As stated, the wireless network 100 illustrates an ad hoc network of eleven nodes (also known as "entities" or "network elements"), ten of which are acting as clients, and at least one (marked "server") acting as the server 102 (also known as an "entity" or "network element").

By "ad hoc" network, it is meant a communication network such as a wireless network that is formed when one node is communicatively coupled to another node, the communication network possibly including local as well as remote, such as across a gateway, communications. Arrows representing packet flow are shown and should be understood to represent multi-directional transmissions if required. For example, each node 104 may act as a network element for other node(s) traffic, i.e., client 5 may act to route packets from client 4 to client 9.

In the illustrated embodiment, in order to test packet loss on a per node basis, each node 104 is assigned a unique identifier, which the node 104 (sometimes referred to herein as the "client") would use when generating packets. The server 102 may then identify the origination point of the packet (which may be different than the most recent source address of the packet) based upon the unique identifier. Each client may also maintain a count of the number of packets that the client has transmitted, and encode that count into each packet that is subsequently transmitted.

In this environment, client 1, client 4 and client 7 may experience a higher packet loss then client zero because each is connecting (multi-hopping) to the server 102 via client 5 while client 0 is connecting directly (single hop) to the server 102. This packet loss may be a result of unreliability in a wireless transmission medium; or because client 5's inability to receive a limited number of packets at any given time. Using the per-node packet loss tests, an administrator may be able to see which nodes are experiencing an excessive loss of packets and may be able to take corrective actions to alleviate the problem.

To handle the reported losses, an administrator may reposition the nodes to reduce the hop distance between nodes one, four, and seven and the server 102 or add more nodes to reduce the amount of traffic flowing through node five. Unlike prior art systems, overall mesh network viability of the wireless network 100 is determined by measuring the packet loss from each of the nodes 104 and the server 102.

Figure 2:
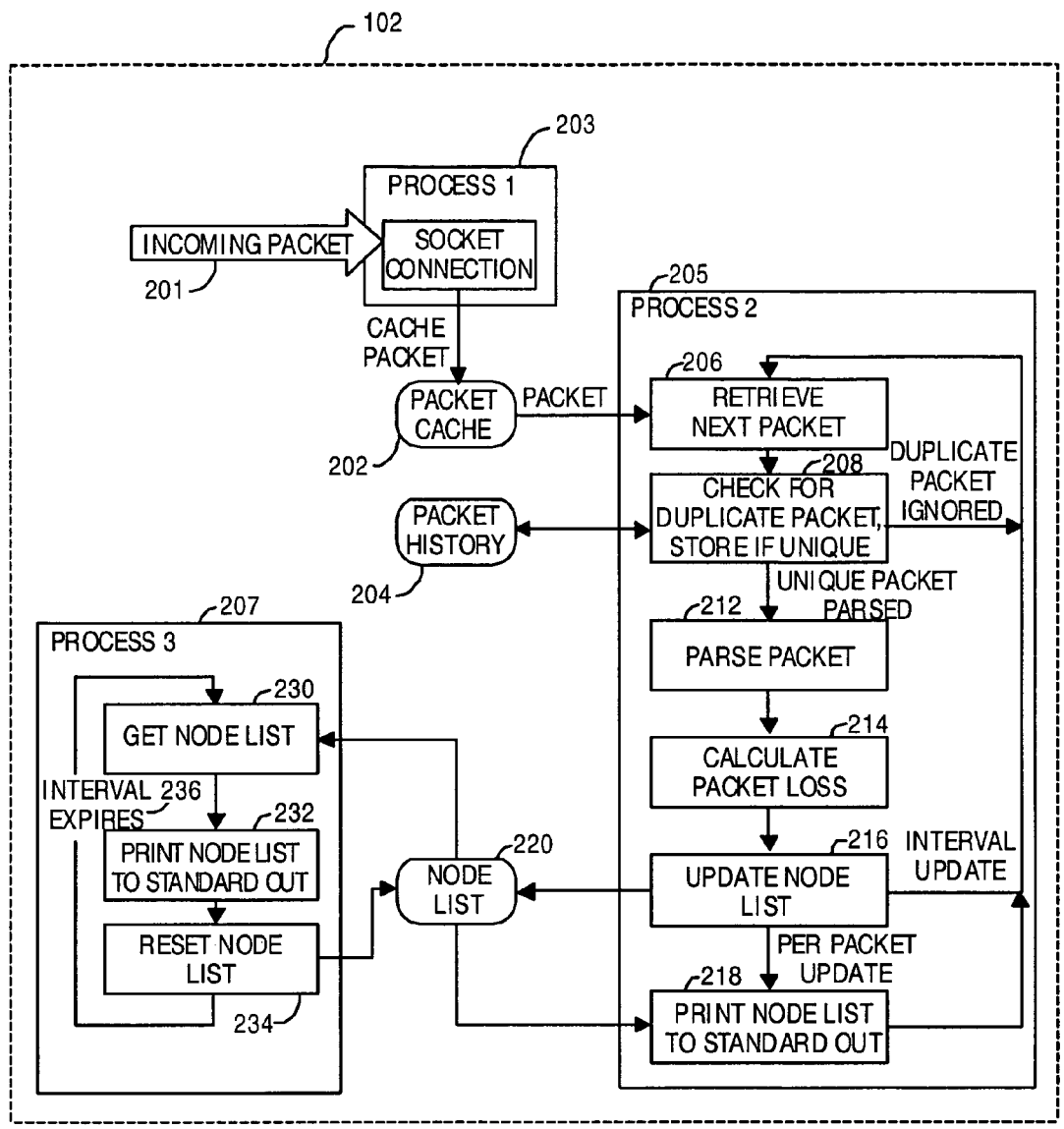
FIG. 2 illustrates one embodiment of packet flow in a server according to the wireless network of FIG. 1.

FIG. 2 illustrates one embodiment of packet flow in the server 102 of the wireless network 100, and shows the flow of a packet once it enters the server 102 and how the data of the packet is parsed, stored, and displayed. When a packet arrives 201, it may be stored for later processing (in the packet cache 202), it may be processed upon receipt at the socket connection 203, or the server 102 may perform some other action which for purposes of understanding the present disclosure has not been described herein. If the packet is cached, the server 102 may associate an identifier with the out-of-order packets prior to processing the packets.

In process two 205, for each retrieved packet 206, the server 102 compares the retrieved packet with the last N number of packets 208 that have been received (stored in the packet history list 204) to determine if the packet is a duplicate packet. If the server 102 determines that the packet is a duplicate packet, the server 102 is able to discard the duplicate packet and process the next packet in the cache. The server 102 may also track the number of duplicate packets that are being received by the server which can be stored with the node hash element (not illustrated). The node hash element represents the information for a specific node 102, 104 in the wireless (or mesh) network 100. This is a data store and has no functionality other then to maintain a record of its given node's information.

When a unique packet is found, the server 102 parses the packet 212, and the server 102 retrieves the node identifier from the packet as well as retrieving the packet number from the packet. The server 102 then calculates the packet loss 214 by comparing the packet number from the immediately preceding packet received from that node 104 against the current packet number. Using the difference between the two numbers, the server 102 is able to determine the number of packets that have been lost during packet transmission in the transmission medium. Any difference greater than one is considered to be the lost packet count. The formula for calculating packet loss is:

$$P_{k+1} = P_k + (C - L - 1)$$

where:
 $P_K$=total packet loss calculated in a previous period
 $P_{K+1}$=total packet loss calculated in a current period
 C=packet count in the current period; and
 L=packet count in the previous period.

The server 102 may stores the previous packet count and packet loss information. The server 102 may also store additional information such as duplicate packet count, out-of-order packet count, last packet arrival time, or other relevant packet information that might be desired or obtainable. The server 102 may store this information in a hash table (not shown) or other convenient programming utility. The server 102 stores this packet information at either a fixed interval (e.g., once every five seconds, ten seconds, etc.) or until the packet cache 202 is exhausted.

The server 102 may cause node list information 220 to be directed to standard out 218. Node list information 220 is updated 216 for each packet received by the server 102 with packet loss information and any other information meant to be stored by the server 102. With interval updates, the option exists for the server 102 to reset the node list 220 to a zero state to reflect, for example, a changing network topology. When the network topology changes during an interval, the server 102 may show the packet loss rate for only those nodes 104 whose packets were recorded during the interval. Process two 205, as distinguished from process three 207 described herein, may be considered to provide a cumulative display of the node list information 220.

Unlike process two 205, in process three 207 an interval, rather than cumulative, display of node list information 220 is carried out. In process three 207, the node list information 220 is generated in which the node list information 220 is updated periodically over an interval in which a get node list command 230 is executed prior to printing the node list to standard out 232. When the node list is reset 234, it is used as the node list 220 until the interval expires 236. The interval expires 236 when a particular amount of time passes that a user selects for an interval, i.e., "X" number of seconds (adjustable by the user).

In process three 207, the server 102 reads the node list 220 during process three 207 and displays statistics that were recorded from the last time that the server 102 read the node list 220. The server 102 then resets the statistics (e.g., packets received, packets expected, etc.) back to zero, and continues with process three 207. Process three 207 represents a user influenced interval display in order to compensate for occasional discrepancies in packet transmissions in the wireless network 100. Process three 207 allows for a sampling of mesh viability over a specific period of time rather than the cumulative mesh viability that is reported by default in process two 205.

The purpose of this recording in process two 205 and process three 207 is to show that data may be captured by the server 102 and shown in at least two separate ways. First, as a real time aggregate display in which the cumulative results of the packet loss measurement is reported back to the server 102, and second, as a method to allow a person to see what the packet loss might be for a specific period of time. When a person is able to see what the packet loss is for a specific period of time, the person is able to see if a sudden packet loss in the wireless network 100 is a result of a transitory error in the packet flow of the network 100, or a pattern of repeated packet loss that should be appropriately handled by a system administrator for the wireless network 100.

While the invention has been described in terms of several embodiments, those of ordinary skill in the art should recognize that the invention is not limited to the embodiments described, but can be practiced with modification and alteration within the spirit and scope of the appended claims. The description is thus to be regarded as illustrative instead of limiting.

What is claimed is:

1. A method comprising:
 measuring cumulative mesh network viability, based upon at least one server calculated packet loss information, from packets transmitted from at least one of a plurality of nodes, wherein a wireless network is an ad hoc wireless network and the packet loss information is calculated by:

$$P_{k+1} = P_k + (C - L - 1)$$

where $P_K$=total packet loss calculated in a previous period, $P_{K+1}$=total packet loss calculated in a current period, C=packet count in the current period, and L=packet count in the previous period.

2. The method of claim 1 further comprising storing the packet loss information at the at least one server.

3. The method of claim 2 wherein said storing the packet loss information comprises network protocol processing a received packet upon receipt of the received packet at the at least one server.

4. The method of claim 2 wherein said storing the received packet at the at least one server comprises processing the received packet at a time period subsequent to the arrival of the received packet at the server.

5. The method of claim 2 wherein said storing the received packet at the at least one server comprises associating an identifier with the received packet prior to processing the received packet.

6. The method of claim 2 wherein said storing the received packet at the at least one server further comprises comparing the packet with a plurality of previously received packets to determine whether a duplicate packet had been transmitted.

7. The method of claim 6 Wherein the at least one server discards the received packet in response to detecting that the received packet is a duplicate packet that has been transmitted.

8. The method of claim 2 where said storing the packet loss information at the at least one server is for access at a future period of time.

9. The method of claim 1 wherein mesh network viability is the cumulative packet loss in the ad hoc wireless network.

10. A wireless network comprising:
a plurality of nodes configured to at least transmit packets in the wireless network;
at least one server operably configured to calculate packet loss information in the wireless network during packet transmission from at least one of the plurality of nodes such that overall mesh network viability of the wireless network is measured in the wireless network, wherein the wireless network is an ad hoc wireless network and the packet loss information is calculated by:

$$P_{k+1} = P_k + (C - L - 1)$$

where $P_K$ = total packet loss calculated in a previous period, $P_{Kk+}$ total packet loss calculated in a current period, C=packet count in the current period, and L=packet count in the previous period; and
a store for storing the packet loss information.

11. The wireless network of claim 10 wherein the store for storing the packet loss information is at the at least one server.

12. The wireless network of claim 10 wherein the store for storing the packet loss information is operably configured for access at a future period of time.

13. The wireless network of claim 10 wherein the store for storing the packet loss information is operably configured for processing out-of-order packets.

14. The wireless network of claim 10 wherein the at least one server discards the packets.

* * * * *

UNITED STATES PATENT AND TRADEMARK OFFICE
CERTIFICATE OF CORRECTION

PATENT NO. : 7,885,197 B2
APPLICATION NO. : 10/716045
DATED : February 8, 2011
INVENTOR(S) : Metzler Page 1 of 1

It is certified that error appears in the above-identified patent and that said Letters Patent is hereby corrected as shown below:

In column 10, at line 2 delete, "$P_{Kk+}$" and insert -- $P_{k+1}$ --.

Signed and Sealed this
Fifth Day of July, 2011

David J. Kappos
*Director of the United States Patent and Trademark Office*